United States Patent [19]

Hwang

[11] Patent Number: 5,186,511
[45] Date of Patent: Feb. 16, 1993

[54] SUN SHADE FOR THE WINDSHIELDS AND WINDOWS OF AN AUTOMOBILE

[76] Inventor: Tsong-Ching Hwang, No. 54-5, Sec. 1, Hsin Sheng S. Road, Taipei, Taiwan

[21] Appl. No.: 820,245

[22] Filed: Jan. 14, 1992

[51] Int. Cl.5 ............................................. B60J 1/20
[52] U.S. Cl. .................................. 296/95.1; 296/152; 296/154
[58] Field of Search .................... 296/95.1, 99.1, 152, 296/154; 454/128, 131, 134

[56] References Cited

U.S. PATENT DOCUMENTS

| | | | |
|---|---|---|---|
| 1,556,902 | 10/1925 | Beville et al. | 296/95.1 |
| 1,942,225 | 1/1934 | Tibbetts | 296/152 X |
| 2,470,477 | 5/1949 | Ellithorpe | 296/95.1 |
| 2,738,221 | 3/1956 | Zwaska | 296/95.1 |

Primary Examiner—Dennis H. Pedder
Attorney, Agent, or Firm—Bacon & Thomas

[57] ABSTRACT

A sun shade for the windshields and windows of an automobile, including a front shield, a pair of first side shields, a pair of second side shields, and a back shield secured to the windshield frames and door frames so that each shield projects outwardly to shield the windshields and windows from rain, snow and direct sunlight without obstructing the driver's field of view.

2 Claims, 4 Drawing Sheets

SUN SHADE FOR THE WINDSHIELDS AND WINDOWS OF AN AUTOMOBILE

BACKGROUND OF THE INVENTION

1. Field of the Invention

The present invention relates to a sunshade for an automobile, particularly a sunshade for a windshield or door window as a shield against rain, snow or sunlight.

2. Description of the Prior Art

Generally no sunshade is used for the door window of an automobile to protect the window from exposure to rain, snow or sunlight. The lack of such a sunshade may affect the driver's field of view or render a passenger uncomfortable.

SUMMARY OF THE INVENTION

In consideration of the above defects, the present invention provides a sunshade for the door window of automobile which has the following features:

(1) Each shield according to the present invention can be installed on a car body by means of bolts, welding or other appropriate method with a rubber gasket between it and the car body to prevent leakage and flow of rain water to the windshield or window.

(2) Each shield according to the present invention extends out of the car body adequately to shelter rain, snow and sunlight, and to guide flow of rain water on the car body in order to prevent adherence of water on windshields and windows.

(3) A flexible folded portion and curved slot at each side of the front shield for adjustment of the front shield to a desired degree by sliding a positioning bolt along the slot.

(4) Each side shield for the front door window has a lower portion angled 45 degree forward as a shelter without interference to the driver's field of view.

(5) A toothed element at the turning point on each side of the back shield to ease adjustment of the back shield to fit the width of the car.

(6) Simple shield structure for easy installation as shelter from rain, snow and sunlight, and to maintain windshields and windows clean for the highest visibility during driving.

The main object of the present invention is to provide a sunshade, particularly a set of shields installed around a car to shelter from rain, snow and sunlight. It comprises a front shield, a pair of first side shields, a pair of second side shields, and a back shield fixed to windshield frames or door window frames by means of bolts or welding or other appropriate method so that each shield projects outwardly to shield against rain, snow and direct sunshine without obstructing the driver's field of view.

DETAILED ON OF THE PREFERRED EMBODIMENT

Figure 1:
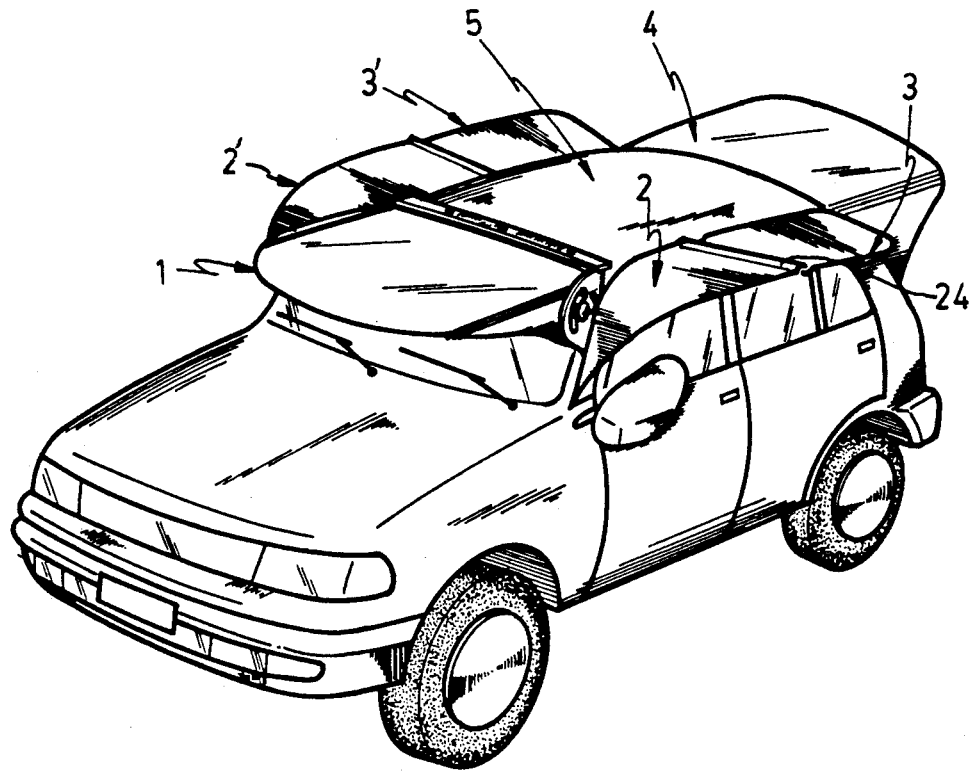
FIG. 1 is a perspective view of a sunshade for the windshields and windows of an automobile according to the present invention.
Figure 2:
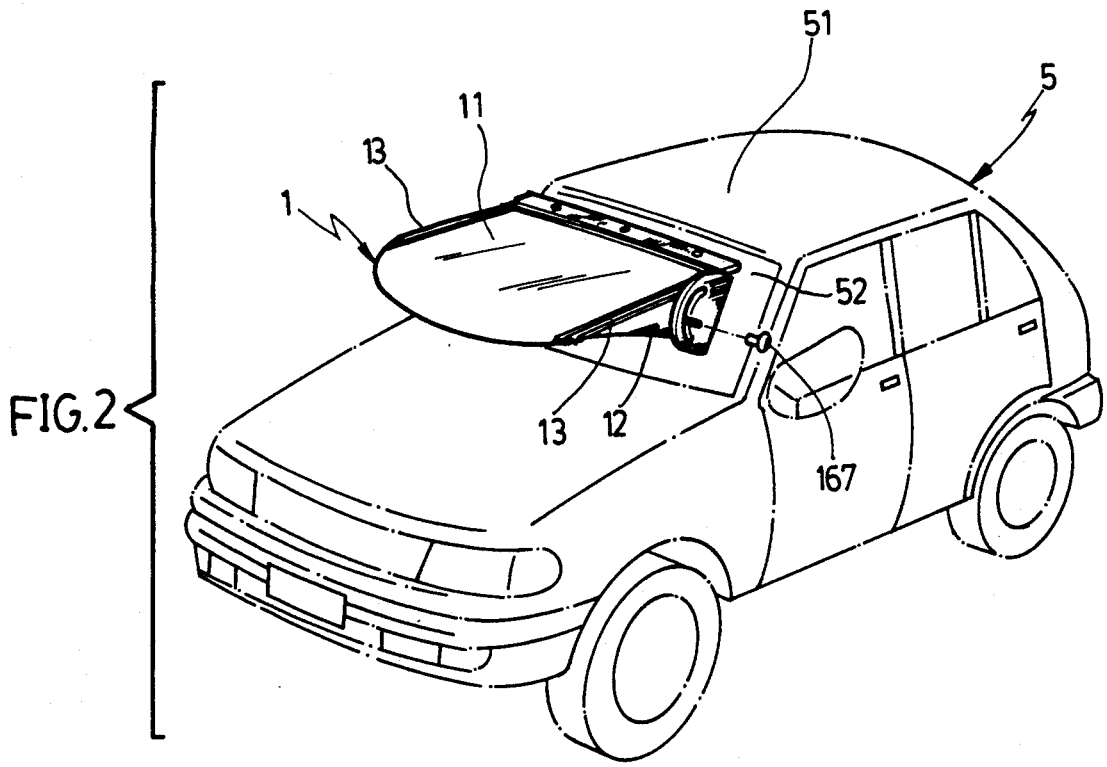
FIG. 2 is an exploded view of the front shield according to the present invention.
Figure 3:
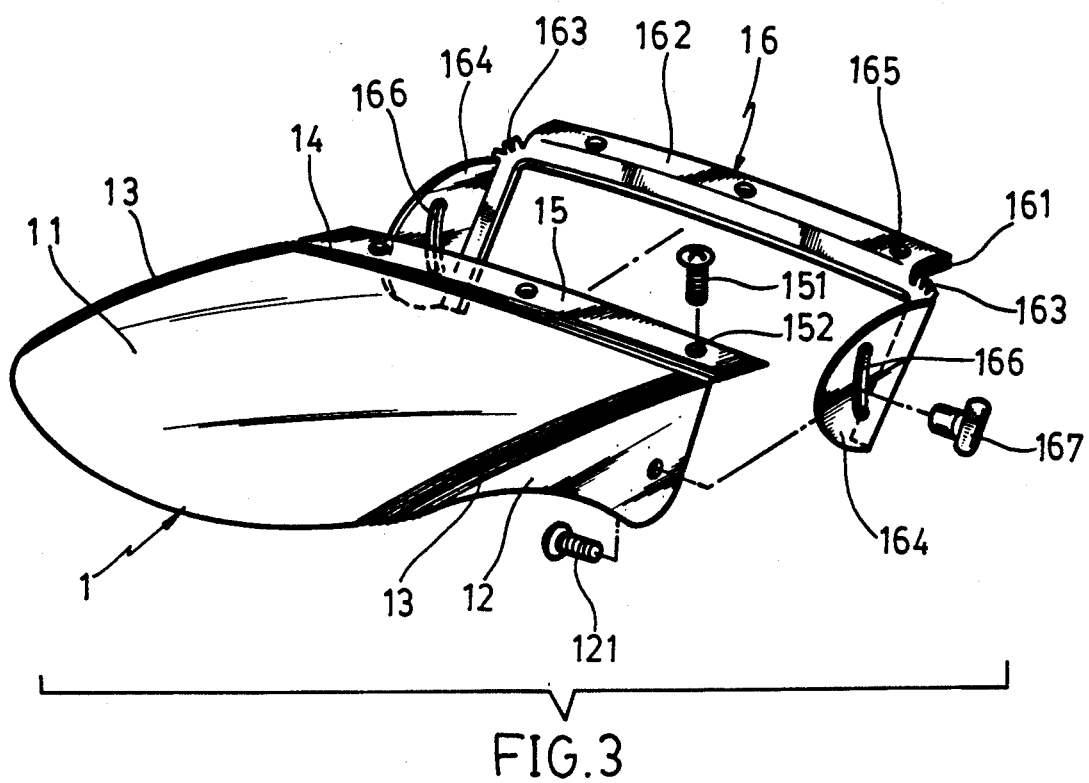
FIG. 3 is another exploded view of the front shield according to the present invention.
Figure 4:
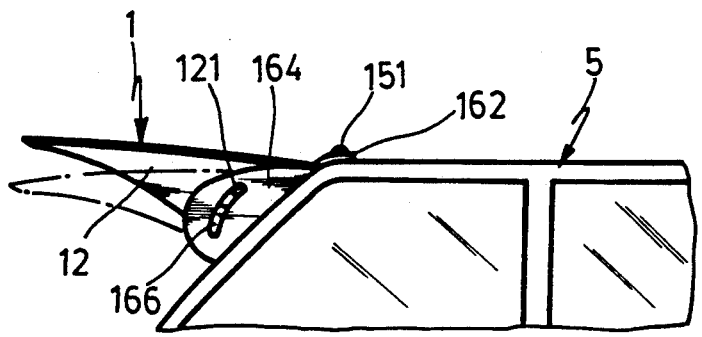
FIG. 4 illustrates use of the front shield according to the present invention.

As shown in FIG. 1, the sunshade according to the present invention comprises a front shield (1), two first side shields (2 and 2'), two second side shields (3 and 3'), and a back shield (4). As shown in FIGS. 1, 2 and 3, the front shield (1) is composed of a top cover plate (11) and two symmetric side covers (12) each having a first folded portion (13) at turning line on each lateral side. On the back of the front shield (1), a second folded portion (14) and a positioning portion (15) are formed. A frame (16) is designed at the back of the front shield (1). The frame (16) has a rubber pad (161) at each lateral side, a positioning portion (162) formed with symmetric toothed elements (163) and a pair of supports (164) for fixing the front shield (1) to the joint between roof (51) and wind shield (52) of a car (5) by means of bolts (151) passing bolt holes (152 and 165). The toothed elements (163) at each side of the frame (16) can be adjusted to fit the width of car (5) for positioning purpose. The support at each lateral side of the frame (16) has a curvy slot (166) for slidably receiving a positioning bolt (121) fixed to each side cover (12) in order to adjust the declination of the front shield (1) with the aid of the flexibility of the second folded portion (14). With such a front shield (1) installed on the upper front part of the car (5), a shield is provided to repel rain, snow and direct exposure to sunlight.

Figure 5:
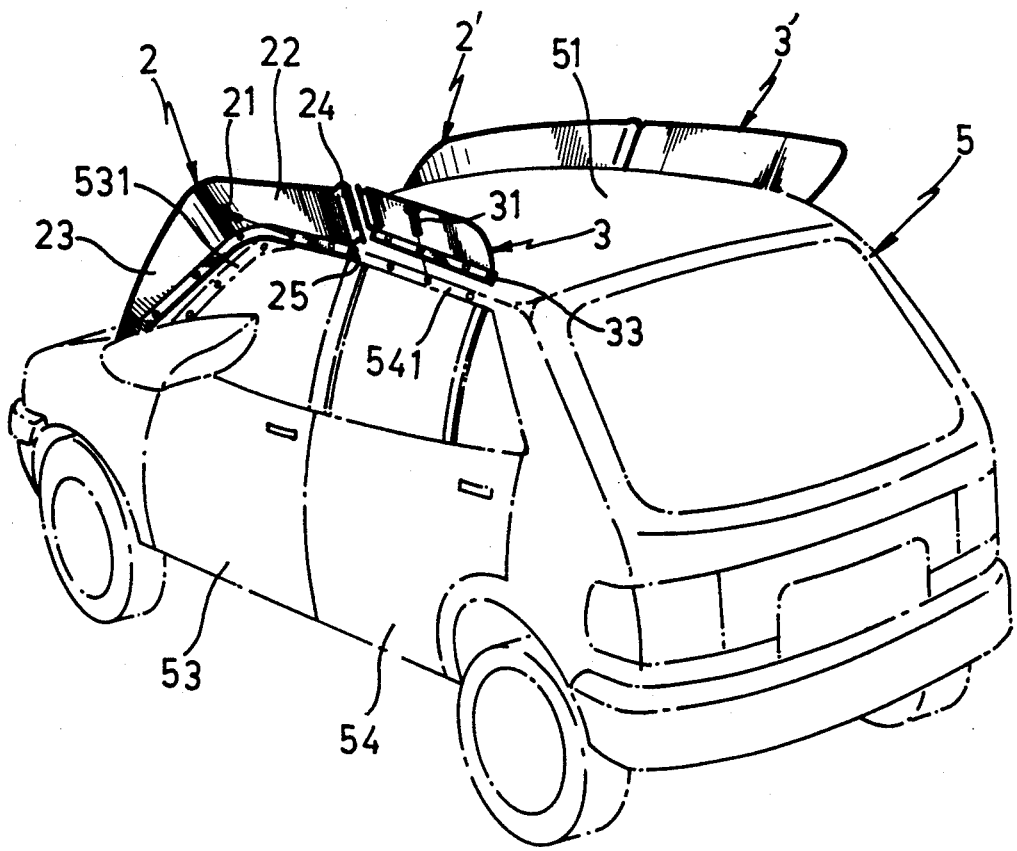
FIG. 5 is a fragmental view of the first and second side shields according to the present invention.
Figure 6:
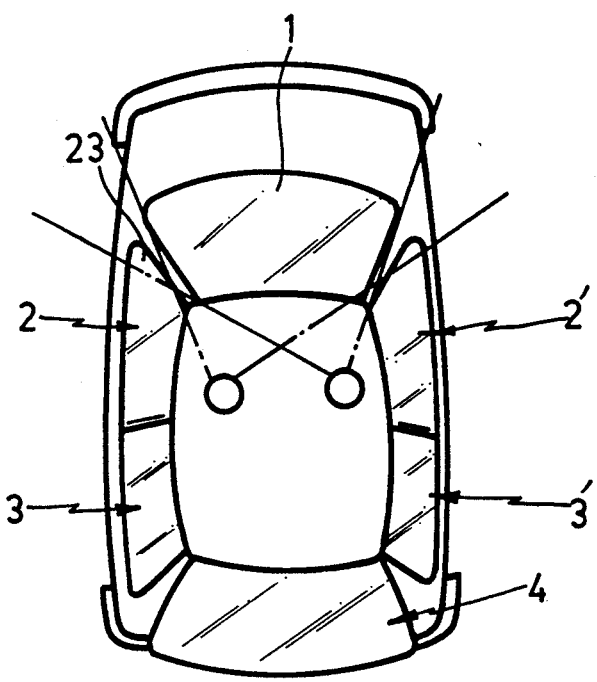
FIG. 6 illustrates the first side shield and driver's field of view.

As shown in FIGS. 1, 5 and 6, each of the first side shield (2 and 2') is fixed to a left or right front door frame (531) by means of bolts (21). The upper part (22) of the first side shield (2) is in the form of an appropriately inclined cover, from which a lower part (23) is extended forward and then turned 45 degree to form a front side cover element. As shown in FIG. 6, since the lower part (23) is turned 45 degree from the car body, it will not affect the driver's field of view. Please refer to FIG. 7, a curved portion (24) is formed at the back of the upper part (22) of the first side shield (2) to cover the front end of a second side shield (3) behind it. The other first side shield (2') has the same structure as the first side shield (2), but in opposite direction. With such structures, the respective front windows are prevented from contact by rain and snow, as well as direct exposure to sunlight.

Figure 7:
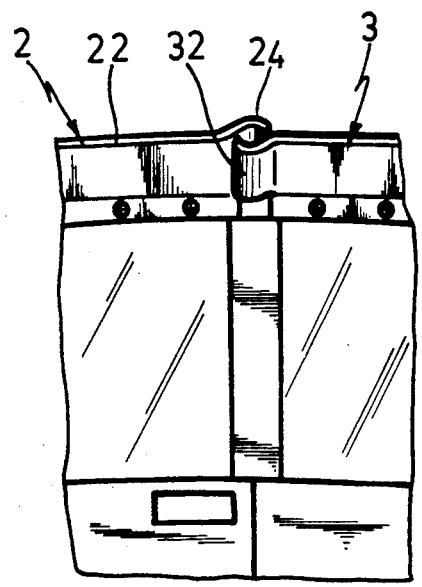
FIG. 7 illustrates fragmented portions of the first and second side shields according to the present invention.

As shown in FIGS. 1 and 5, each of the second side shields (3 and 3') is fixed to a left or right rear door frame (541) by means of bolts (31). The second side shield (3) is in the form of a appropriately inclined cover. As shown in FIG. 7, a drain channel (32) is formed at the front end of the second side shield (3), and the drain channel (32) is covered by the first side shield (2). The drain channel (32) is designed to drain rain water on the second side shields (3 and 3') to prevent moisture on the rear door windows. With such structures, the respective front windows are prevented from contact by rain and snow, as well as direct exposure to sunlight.

Figure 8:
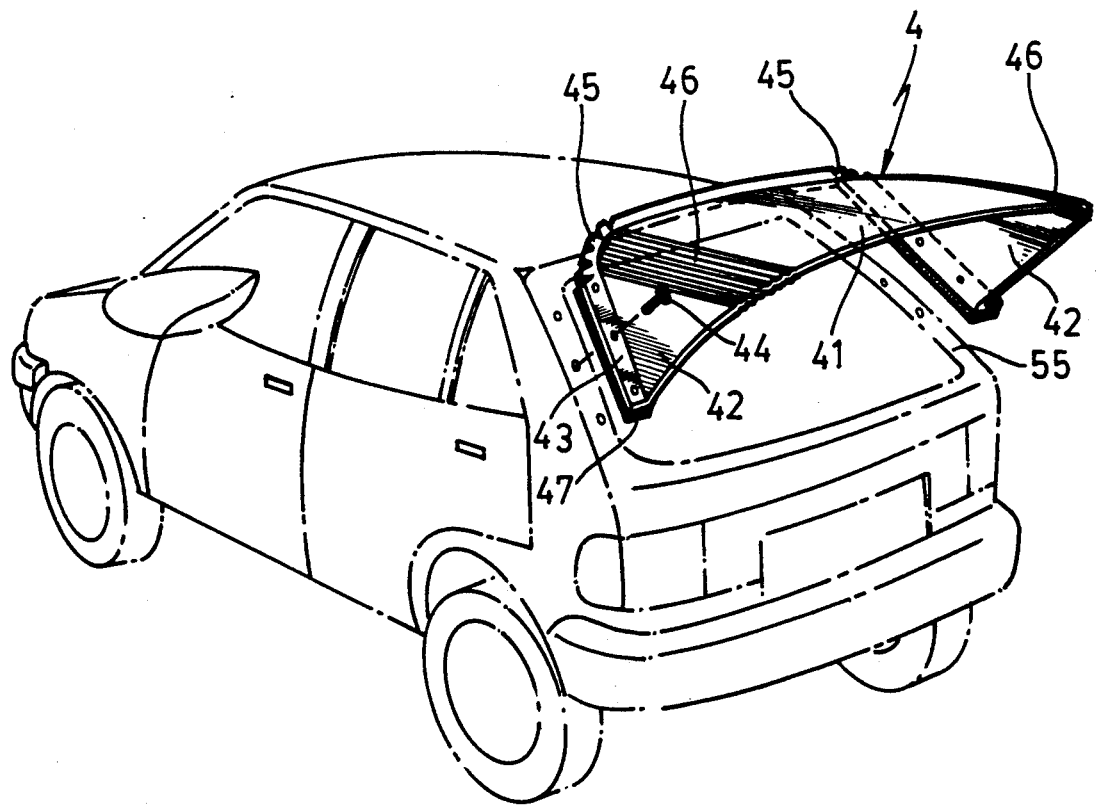
FIG. 8 is a fragmental view of the back shield according to the present invention.

As shown in FIGS. 1 and 8, the back shield (4) according to the present invention is in the form of a wide cover (41) with a wing (42) bent at each lateral side, and a positioning frame (43) on its outer edge for fixing to rear wind shield frame (55) by means of bolts (44). A toothed element (45) is formed along the positioning frame (43) and a folded portion (46) is formed along the wide cover (41) at the turning location at each side of the back shield (4) so that the positioning frame (43) and the wings (42) become flexible to ease adjustment for fitting to the rear wind shield frame (55), and then such back shield (4) can repel rain and snow, as well as direct exposure to sunlight.

As shown in FIGS. 3, 5 and 8, while the front shield (1), the first side shields (2 and 2'), the second side shields (3 and 3') and the back shield (4) are fixed to car (5), rubber gaskets (161, 25, 33 and 47) are placed between each shield and the car body to provide a water tight seal. Moreover, any of the shields according to the present invention can be fixed to the car body by welding or other method, and can be formed individually to fit different car models.

I claim:

1. A sun shade for the windshields and windows of an automobile comprising:
   a) a front shield including a top cover plate and a frame;
   b) the top cover plate including a pair of side covers, each side cover extending downwardly from a first folded portion, a first positioning portion, and a second folded portion joining the cover plate to the first positioning portion;
   c) the frame including a second positioning portion for attachment to a front windshield frame, means for attaching the first positioning portion to the second positioning portion, a rubber pad for disposition between the second positioning portion and the front windshield frame, a pair of toothed elements at opposite sides of the second position portion, a pair of supports, and means for attaching the top cover plate to the supports to permit the declination of the top cover plate to be adjusted relative to the frame about the second folded portion;
   d) a pair of first side shields, each first side shield including an upper part defining an inclined cover and a lower part extending forwardly and turned downwardly to define a front side cover, and means for securing the first side shields to the front window frames of an automobile;
   e) a pair of second side shields, each second side shield defining an inclined cover, and means for securing the second side shields to the rear window frames of an automobile; and
   f) a back shield including two lateral sides, a downwardly bent wing portion forming a folded portion at each lateral side, a third positioning portion, means for securing the third positioning portion to the rear windshield frame of an automobile, and a toothed element at each lateral side.

2. The sun shade of claim 1 further including a joint between each first and second side shields, the joint being defined by a curved portion formed on a back end of each first side shield and a channel formed on a front end of each second side shield, with the curved portion covering the channel for permitting rain water to be directed into and drain along the channel.

* * * * *